(12) United States Patent
Azoulay

(10) Patent No.: US 9,301,462 B2
(45) Date of Patent: *Apr. 5, 2016

(54) AUTOMATIC HYDROPONIC CLONING APPARATUS

(71) Applicant: Sidney S. Azoulay, Las Vegas, NV (US)

(72) Inventor: Sidney S. Azoulay, Las Vegas, NV (US)

(*) Notice: Subject to any disclaimer, the term of this patent is extended or adjusted under 35 U.S.C. 154(b) by 315 days.

This patent is subject to a terminal disclaimer.

(21) Appl. No.: 13/950,324

(22) Filed: Jul. 25, 2013

(65) Prior Publication Data

US 2013/0305603 A1    Nov. 21, 2013

Related U.S. Application Data

(63) Continuation-in-part of application No. 11/490,919, filed on Jul. 21, 2006, now Pat. No. 8,516,742.

(60) Provisional application No. 60/701,291, filed on Jul. 21, 2005.

(51) Int. Cl.
*A01G 31/02*     (2006.01)
*A01G 27/02*     (2006.01)

(52) U.S. Cl.
CPC .............. *A01G 31/02* (2013.01); *A01G 27/02* (2013.01)

(58) Field of Classification Search
CPC ............................... A01G 27/02; A01G 31/02
See application file for complete search history.

(56) References Cited

U.S. PATENT DOCUMENTS

| | | | |
|---|---|---|---|
| 2,815,246 A | | 12/1957 | Nyrop |
| 3,606,697 A | * | 9/1971 | Eden ................................. 47/69 |
| 4,144,671 A | | 3/1979 | Lee |
| 4,149,970 A | * | 4/1979 | Atkins et al. ................... 47/62 N |
| 4,976,064 A | | 12/1990 | Julien |
| 4,989,367 A | | 2/1991 | Chung |
| 5,025,589 A | | 6/1991 | Park |
| 5,607,627 A | | 3/1997 | Berkeley et al. |
| 6,442,892 B1 | | 9/2002 | Azoulay |
| 8,516,742 B1 | * | 8/2013 | Azoulay ........................ 47/62 A |

OTHER PUBLICATIONS http://www.simplyhydro.com/Automated%20Cloning.htm.
http://www.turboklone.com/docs/TK_Manual.pdf.

* cited by examiner

*Primary Examiner* — Brian M O'Hara
*Assistant Examiner* — Michael Kreiner
(74) *Attorney, Agent, or Firm* — Raj Abhyanker, P.C.

(57) ABSTRACT

This disclosure relates generally to an automatic hydroponic cloning apparatus, more particularly to an automatic hydroponic cloning apparatus to provide a thin mist for watering the roots of plants. In one example embodiment, the automatic hydroponic cloning apparatus is configured to: circulate mist to provide humidity to the leaves of plants, to control water temperature, to control humidity levels, to be notified of low water levels, and to measure pH levels of the water.

9 Claims, 4 Drawing Sheets

AUTOMATIC HYDROPONIC CLONING APPARATUS

CLAIM OF PRIORITY

This is a Continuation In-Part (CIP) application and claims priority from, and incorporates by reference in its entirety, co-pending U.S. patent application Ser. No. 11/490,919 filed on Jul. 21, 2006, which further claims priority from Provisional Patent Application No. 60/701,291, filed on Jul. 21, 2005.

FIELD OF TECHNOLOGY

This disclosure relates generally, in one example embodiment, to an automatic hydroponic cloning apparatus, more particularly an automatic hydroponic cloning apparatus to provide a thin mist for watering the roots of plants, to allow for circulation of mist to provide humidity to the leaves of the plants, to control water temperature, to control humidity levels, to be notified of low water levels, and to measure PH levels of the water.

BACKGROUND

Cloning is a form of plant propagation that has been around for a very long time. It's basically taking a growing portion of a plant—a stem with some leaves attached, and helping it to become a brand new plant that is genetically identical to the plant from which the clone was taken. This is often easy to do because plants often clone themselves in nature. It's called asexual reproduction. The methods currently used today include taking cuttings, layering, division, grafting, budding, and tissue culture. Gardeners often trade cuttings and divisions as a way of sharing plants with their friends.

Experiments show that by starting the feeding immediately after the first roots emerge, immunization and seedling strength are increased and young plants experience minimal shock. In addition, experiments show that providing the growing chamber with a mixture of oxygen and solution under slight pressure, and at any selected temperature assists in proper growth of the cloned plants. By misting roots and cuttings, instead of spraying or irrigating, the water is broken down to a nearly molecular level, thereby carrying more oxygen with the solution to the cutting and making absorption easier and minimizing the risk of mold or rotting.

Despite the number of home and commercial growers available, there is still a need for an apparatus for use by the home owner or small commercial concern which is fully automatic until harvest with no human touch. In addition, the prior art teaches that water with some air circulation provides the best combination for cloning. However, new research indicates that maximizing the air with a minimum amount of water makes for better clones with minimal risk of contamination by molds and the like. Further, some commercial units employ misting systems which generally involve forcing water through small pores. However, such misting systems do not mix air with the water but use water pressure to create mist via a nozzle system which does not introduce clean air from outside the growing compartment. This air that is trapped within the growing compartment can be contaminated with bacteria and recirculation increases the chances of contamination. Thus, there is a need to provide a cloning system which does not employ irrigating or misting with pores systems. Furthermore, there is a need for a cloning system which can allow for control and monitoring of humidity levels, water temperature, water levels, and acidity levels which further contributes to the stabilization of the cloning process. This present invention meets those needs.

SUMMARY

Disclosed is, in one example embodiment, an automatic hydroponic cloning apparatus, more particularly an automatic hydroponic cloning apparatus to provide a thin mist for watering the roots of plants, to allow for circulation of mist to provide humidity to the leaves of the plants, to control water temperature, to control humidity levels, to be notified of low water levels, and to measure PH levels of the water.

In one embodiment, an automatic hydroponic cloning apparatus may comprise of a housing having a plant section, a water section, and an exterior control panel. The plant section and water section may be horizontally separated by a divider. The divider may comprise of a plurality of net pockets. The net pockets may support at least one plant therein, such that the leaves of the at least one plant are housed in the plant section, and the roots of the at least one plant are housed in the water section.

In one embodiment, the plant section may comprise of a transparent cover. The water section may comprise of a mist generator, a water level sensor, a heating pad, and a pH reader. Water may be stored in the water section. The heating pad may be embedded in a floor portion of the water section, and may increase or decrease the temperature of the water.

In one embodiment, the mist generator may provide a mist throughout the housing. The mist may comprise of water drawn from the water section, and from air drawn from outside the housing, and may be a combination of the water and air. The mist generator may further comprise a motor having a hollow tapered power shaft extending downwardly into the water section, wherein the hollow tapered power shaft may comprise a wide portion at the top, a narrow portion at the bottom, and an outwardly sloping inner surface thereof. When the hollow tapered power shaft is rotating, the combination of centripetal force on the water, and the outwardly sloping inner surface of the hollow tapered power shaft may force the water upwardly.

In one embodiment, the mist generator may further comprise of a disk mounted atop the hollow tapered power shaft and may extend laterally therefrom. The disk may receive water from the hollow tapered power shaft and direct water laterally. The disk may further comprise one or more radially oriented blades configured to create a low pressure mixing area above the disk to thereby pull fresh air via suction into the mixing area above the disk and mix the air and water to provide the mist. The mist generator may further comprise of a mesh cage surrounding the disk whereby water from the disk is forced through as a mist.

In one embodiment, the water section of the automatic hydroponic cloning apparatus may further comprise of a water cup and a water pump. The water pump may pump water from the floor of the water section into the water cup. The hollow tapered power shaft of the mist generator may extend into the water cup, and draw water therefrom.

In one embodiment, the heating pad embedded in the floor of the water section may be communicatively coupled to the exterior control panel allowing for manual control of the water temperature. Furthermore, the pH reader of the water section may be communicatively coupled to the exterior control panel such that pH levels detected by the pH reader may be transmitted to a display on the exterior control panel. Furthermore, the water level sensor of the water section may be communicatively coupled to the exterior control panel such that when water levels fall below a desired threshold as detected by the water level sensor, a notification may be transmitted to a display on the exterior control panel.

In one embodiment, the divider may further comprise of a plurality of deflector ports which may be positioned in a front portion of the divider such that mist generated by the mist generator may pass through the water section, through the deflector ports, and into the plant section. The transparent cover of the plant section may further comprise of a plurality of exhaust holes such that mist generated by the mist generator may pass from the water section, through the deflector ports, through plant section, and out of the exhaust holes.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description.

DETAILED DESCRIPTION

Disclosed are a method, an apparatus, and/or a system of an automatic hydroponic cloning apparatus to provide a thin mist for watering the roots of plants, to allow for circulation of mist to provide humidity to the leaves of the plants, to control water temperature, to control humidity levels, to be notified of low water levels, and to measure pH levels of the water, according to one embodiment.

Figure 1:
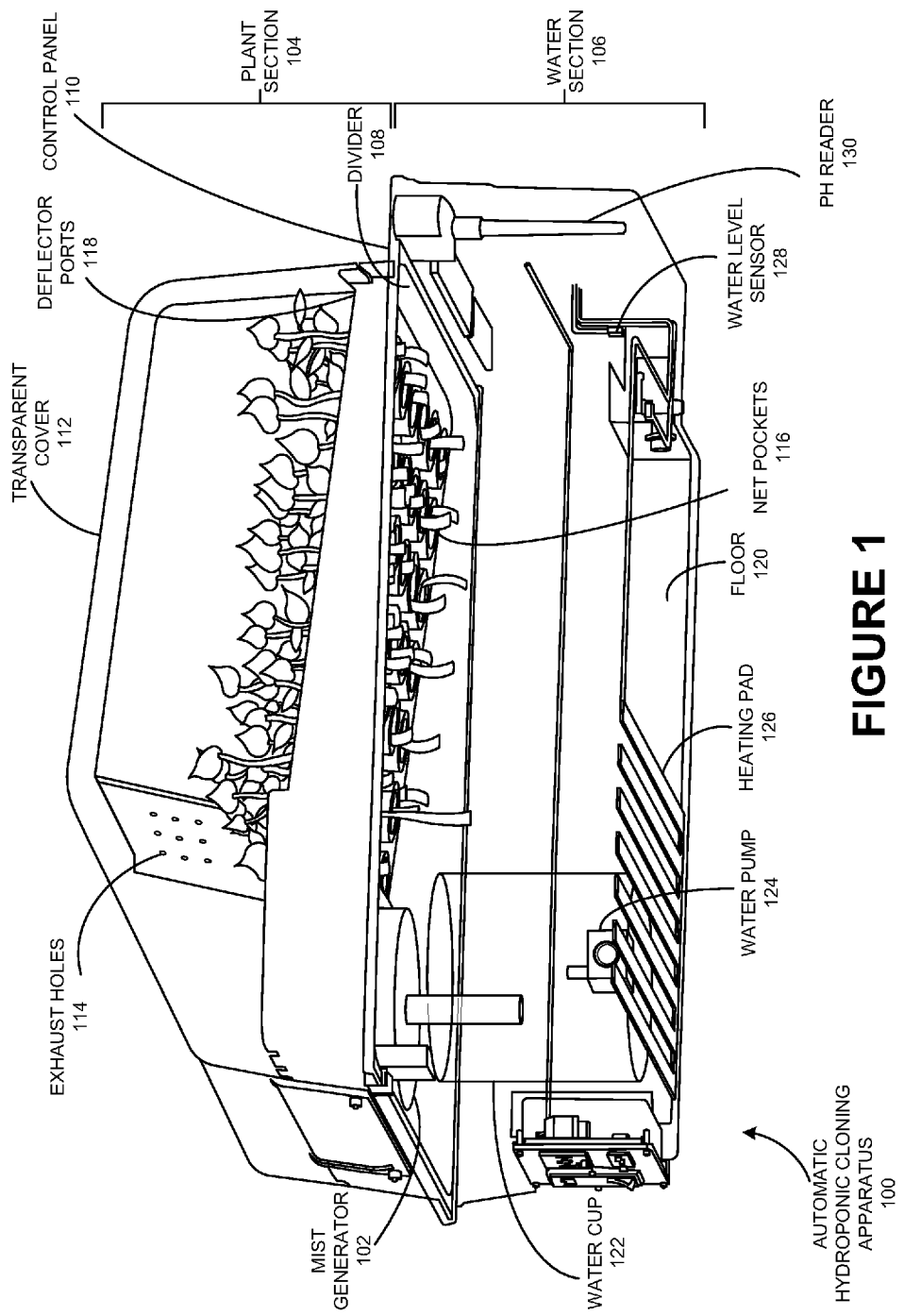
FIG. 1 is a side perspective view of an automatic hydroponic cloning apparatus, according to one embodiment.

Reference is now made to FIG. 1, which is a side perspective view of an automatic hydroponic cloning apparatus 100, according to one embodiment. The automatic hydroponic cloning apparatus 100 may comprise of a mist generator 102, a plant section 104, a water section 106, a divider 108, and a control panel 110. The plant section 104 may be encompassed by a transparent cover 112, which may further comprise a plurality of exhaust holes 114 in the rear of the transparent cover 112. The divider 108 may comprise a plurality of net pockets 116, and a plurality of deflector ports 118 positioned in the front of the divider 108. The water section 106 may comprise of a floor 120, a water cup 122, a water pump 124, a heating pad 126, a water level sensor 128, and a pH reader 130.

According to one embodiment, the automatic hydroponic cloning apparatus 100 may be a housing comprising a plant section 104 and a water section 106, which may be horizontally separated by a divider 108. The plant section 104 may comprise of the space between the divider 108 and the transparent cover 112. The water section 106 may comprise of the space between the divider 108 and the floor 120 of the water section 106. The divider 108 may comprise of a plurality of net pockets 116 which may allow for a plurality of plants to rest therein, such that the leaves of the plants are housed in the plant section 104, and the roots of the plants hang above the water section 106.

According to one embodiment, hanging from the rear of the divider 108 into the water section 106 may be a mist generator 102. The mist generator 102 may draw water from the water section 106 and air from outside the automatic hydroponic cloning apparatus 100 and combine them into a mist to be propelled throughout the water section 106 thereby watering the roots of the plants. The description of the mist generator 102 is incorporated by reference from Parent application Ser. No. 11/490,919 and in particular line 12, page 5-line 2, page 7 and FIGS. 3-6.

The water section 106 may further comprise of a floor 120, a water cup 122, a water pump 124, a heating pad 126, a water level sensor 128, and a pH reader 130, according to one embodiment. The mist generator 102, heating pad 126, water level sensor 128, and pH reader 130 may all be communicatively coupled (e.g. electronically connected) to the exterior control panel 110.

According to one embodiment, water may be stored on the floor 120 of the water section 106 and in the water cup 122. The water pump 124 may pump water from the floor 120 of the water section 106 into the water cup 122 when water levels are low in the water cup 122. In an alternate embodiment, the water pump 124 continuously pumps water from the floor 120 of the water section 106 into the water cup 122 such that water levels in the water cup 122 are consistent. The mist generator 102 may then draw water from the water cup 122, according to one embodiment.

According to one embodiment, embedded in the floor 120 of the water section 106 may be the heating pad 126. The heating pad 126 may be in direct contact with the water stored on the floor 120 of the water section 106. The heating pad 126 may increase or decrease in temperature, thereby increasing or decreasing the temperature of the water stored in the water section 106. The temperature of the heating pad 126 may be controlled via the exterior control panel 110. The heating pad 126 may also comprise of a heat sensor which may recognize when the water in the water section 106 has risen above or fallen below the set temperature of the heating pad 126 (the temperature being set through the exterior control panel 110), and may automatically increase or decrease the temperature of the heating pad 126 such that the water temperature resets back to the set temperature, according to one embodiment.

According to one embodiment, the water level sensor 128 may be positioned near the front of the water section 106. The water level sensor 128 may detect when water levels are below a desired threshold, and subsequently transmit a notification to the exterior control panel 110. The threshold may be determined by the physical vertical position of the water level sensor 128. In an alternate embodiment, the threshold may be determined by a point on the water level sensor 128 itself, such that when the water level falls below that point, a notification is transmitted to the exterior control panel 110.

According to one embodiment, the pH reader 130 may be positioned in a front corner of the housing of the automatic hydroponic cloning apparatus 100, and may comprise of a conical or cylindrical shaft that extends into the water section 106 such that it is in direct contact with the water stored in the water section 106, and a display that extends into the exterior control panel 110 where the display can show the current pH levels in the water section 106.

Figure 2:
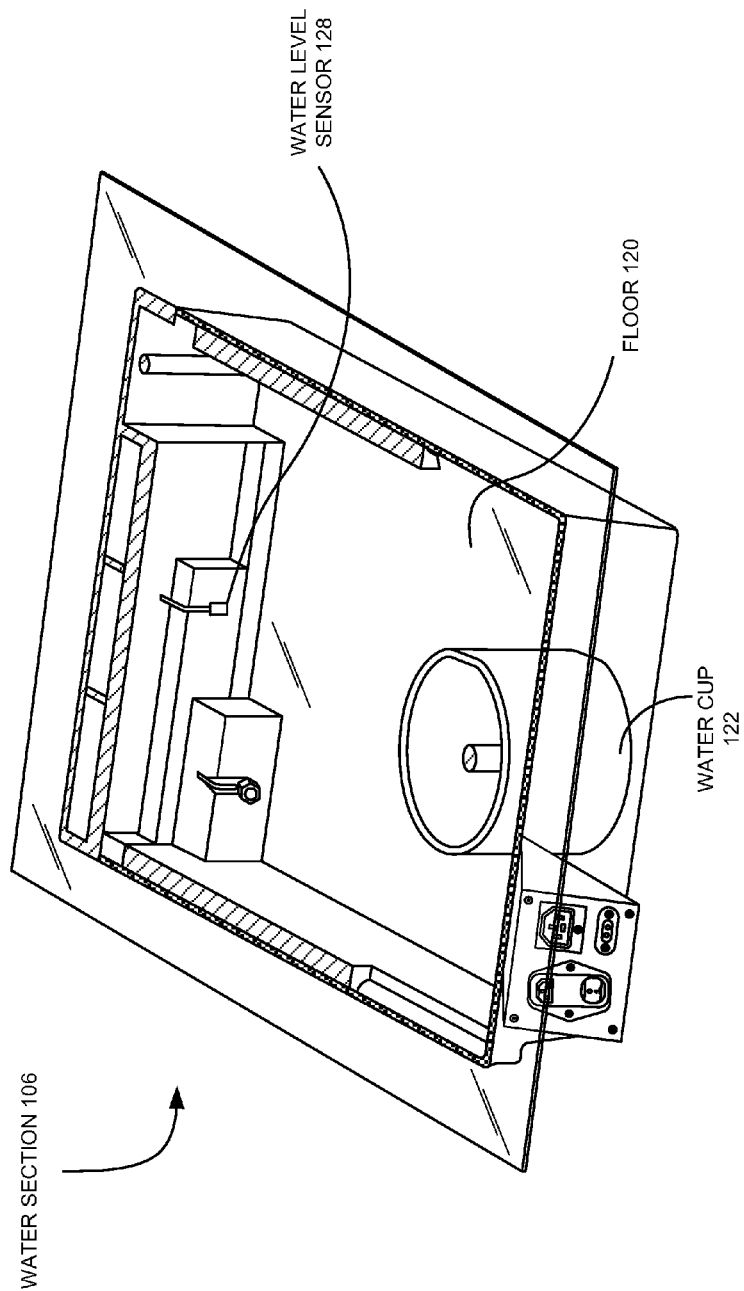
FIG. 2 is a close up cross sectional interior view of a water level sensor, according to one embodiment.

Reference is now made to FIG. 2 which is a close-up cross sectional interior view of the water level sensor 128, according to one embodiment.

Figure 3:
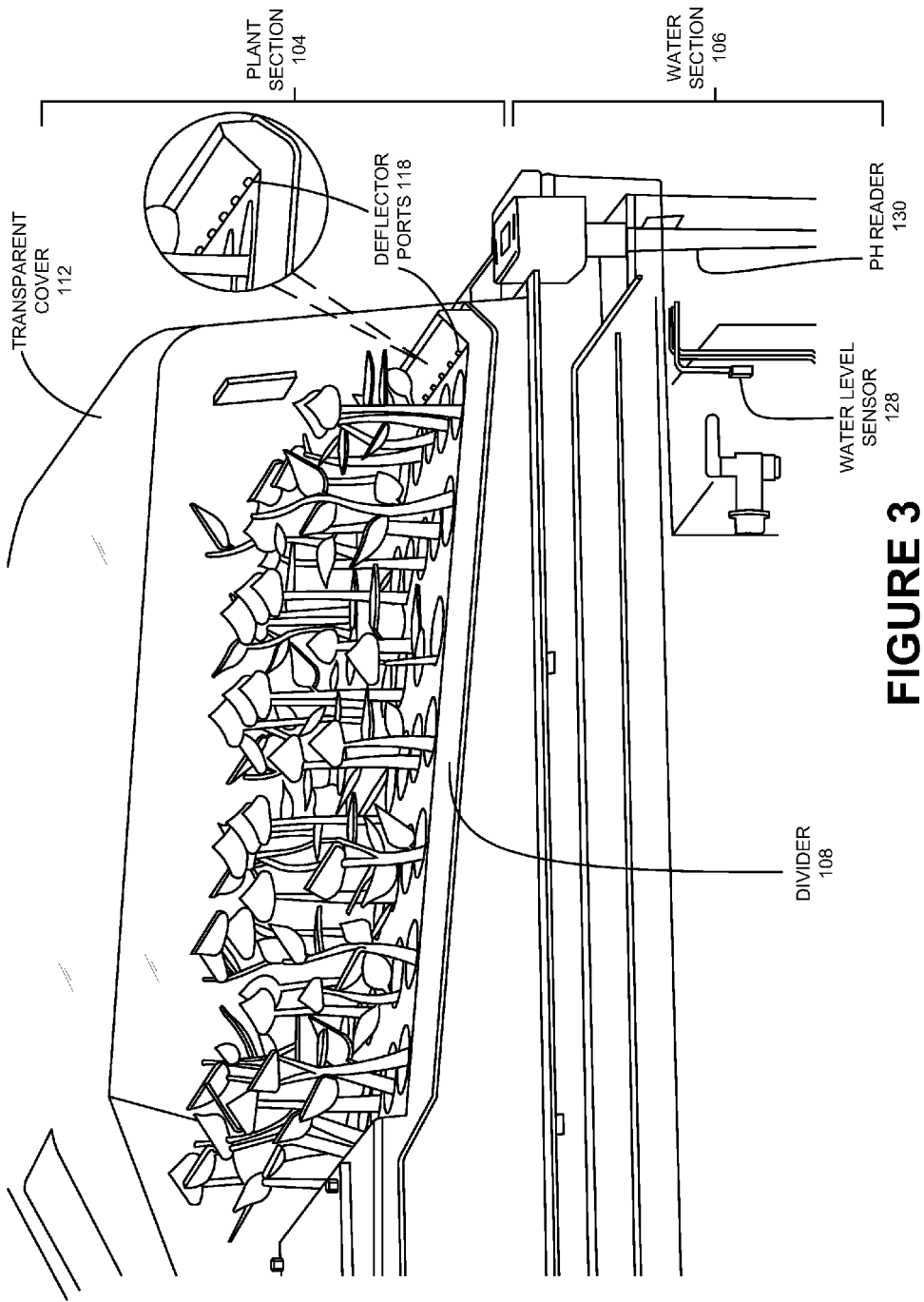
FIG. 3 is a close up and magnified view of deflector ports, according to one embodiment.

Reference is now made to FIG. 3 which is a close up and magnified view of the deflector ports 118, according to one embodiment. The deflector ports 118 may be a plurality of small holes positioned along the front edge of the divider 108. Mist generated by the mist generator 102 may be propelled by the mist generator 102 throughout the water section 106. The mist may then escape the water section 106 through the deflector ports 118 and into the plant section 104, thereby humidifying the leaves of the plants. The remaining mist may then escape through a plurality of exhaust holes 114 positioned in the rear of the transparent cover 112.

Figure 4:
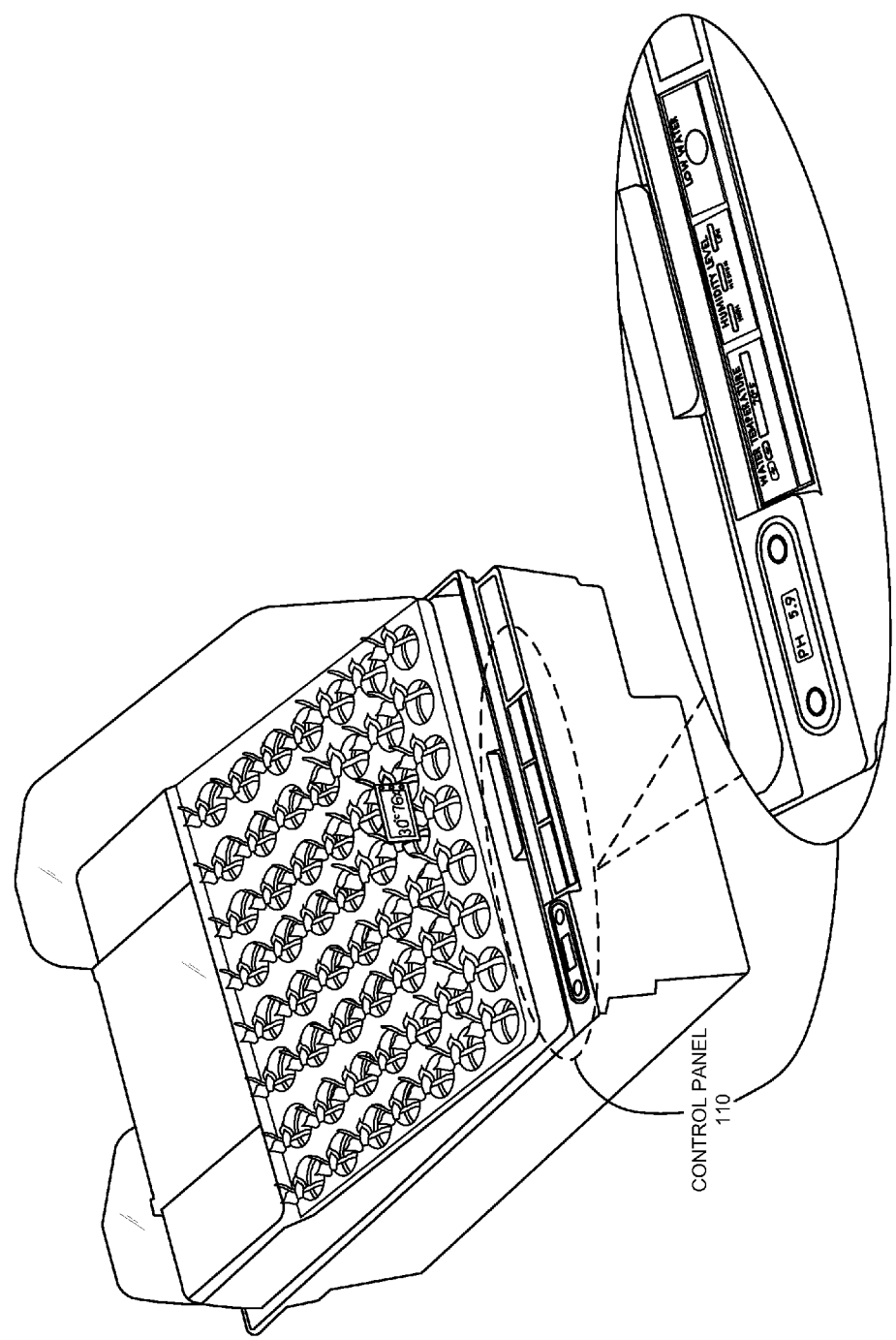
FIG. 4 is a close up and magnified view of a control panel, according to one embodiment.

Reference is now made to FIG. 4 which is a close-up front view of the control panel 110, according to one embodiment. The control panel 110 may be communicatively coupled (e.g. electronically connected) to the mist generator 102, the water pump 124, the heating pad 126, the water level sensor 128, and the pH reader 130. The control panel 110 may have displays which show current pH levels as detected by the pH reader 130, a notification if water levels are below a desired threshold as detected by the water level sensor 128, and/or the current humidity levels inside the housing. The control panel 110 may additionally have controls for increasing or decreasing the temperature of the heating pad 126, thereby increasing or decreasing the temperature of the water stored in the water section 106. Furthermore the control panel 110 may have controls for increasing and/or decreasing the frequency that the mist generator 102 operates, thereby controlling the frequency with which mist is propelled throughout the water section 106. Humidity inside the housing may therefore be controlled through a combination of control over the water temperature through the heating pad 126 and control over the frequency of operation of the mist generator 102, according to one embodiment.

Although the present embodiments have been described with reference to specific example embodiments, it will be evident that various modifications and changes may be made to these embodiments without departing from the broader spirit or scope of the various embodiments. Accordingly, the specification and drawings are to be regarded in an illustrative rather than in a restrictive sense.

What is claimed is:

1. An automatic hydroponic cloning apparatus comprising
a housing having a plant section, a water section, and an exterior control panel, wherein the plant section and the water section is horizontally separated by a divider comprising a plurality of net pockets, each of the plurality of net pockets is configured to support at least one plant therein such that the leaves of the at least one plant are housed in the plant section and the roots of the at least one plant are housed in the water section,
the plant section comprising a transparent cover,
the water section comprising a mist generator, a water level sensor, a heating pad, and a pH reader, wherein the water section is configured to store water therein,
the heating pad being embedded in a floor portion of the water section, configured to increase or decrease the temperature of the water, and
the mist generator configured to provide a mist throughout the housing wherein the mist is generated from water contained within the water section and from fresh air drawn from outside the housing, the mist being a combination of water from the water section and air drawn from outside the housing,
the mist generator comprising a motor having a hollow tapered power shaft extending downwardly into the water section, wherein the hollow tapered power shaft comprises a wide portion at the top, a narrow portion at the bottom, and an outwardly sloping inner surface thereof whereby when the hollow tapered power shaft is rotating, the combination of centripetal force on the water in the hollow tapered power shaft and the outwardly sloping inner surface thereof forces water upwardly,
a disk mounted atop the hollow tapered power shaft and extending laterally therefrom which is configured to receive water from the hollow tapered power shaft and direct the water laterally therefrom, the disk including one or more radially oriented blades configured to create a low pressure mixing area above the disk to thereby pull the fresh air via suction into the mixing area above the disk, the fresh air and the water mixing to provide the mist, and
a mesh cage surrounding the disk whereby water from the disk is forced therethrough as the mist.

2. The automatic hydroponic cloning apparatus of claim 1, wherein the water section further comprises a water cup and a water pump.

3. The automatic hydroponic cloning apparatus of claim 2, wherein the water pump is configured to pump water from the floor portion of the water section into the water cup.

4. The automatic hydroponic cloning apparatus of claim 2, wherein the hollow tapered power shaft of the mist generator extends into the water cup of the water section.

5. The automatic hydroponic cloning apparatus of claim 1, wherein the heating pad is communicatively coupled to the exterior control panel allowing for manual control of water temperature.

6. The automatic hydroponic cloning apparatus of claim 1, wherein the pH reader is communicatively coupled to the exterior control panel such that pH levels detected by the pH reader are transmitted to a display on the exterior control panel.

7. The automatic hydroponic cloning apparatus of claim 1, wherein the water level sensor is communicatively coupled to the exterior control panel such that when water levels fall below a desired threshold, a notification is transmitted to a display on the exterior control panel.

8. The automatic hydroponic cloning apparatus of claim 1, wherein the divider further comprises a plurality of deflector ports positioned in a front portion of the divider such that the mist generated by the mist generator passes from the water section, through the plurality of deflector ports, and into the plant section.

9. The automatic hydroponic cloning apparatus of claim 8, wherein the transparent cover comprises a plurality of exhaust holes positioned in a rear portion of the transparent cover such that the mist generated by the mist generator passes from the water section, through the deflector ports, into the plant section, and out of the plurality of exhaust holes.

* * * * *